(No Model.)

G. B. FRALEY.
STORAGE BATTERY.

No. 513,910. Patented Jan. 30, 1894.

Witnesses:
J. H. Rouse
J. A. Bayless

Inventor,
George B. Fraley
By Dewey & Co.
Attys

UNITED STATES PATENT OFFICE.

GEORGE B. FRALEY, OF SAN FRANCISCO, ASSIGNOR TO JOHN L. ECKLEY, OF ECKLEY'S STATION, CALIFORNIA.

STORAGE-BATTERY.

SPECIFICATION forming part of Letters Patent No. 513,910, dated January 30, 1894.

Application filed June 26, 1893. Serial No. 478,893. (No model.)

*To all whom it may concern:*

Be it known that I, GEORGE B. FRALEY, a citizen of the United States, residing in the city and county of San Francisco, State of California, have invented an Improvement in Storage-Batteries; and I hereby declare the following to be a full, clear, and exact description of the same.

My invention relates to an electrical storage battery.

It consists in certain details of construction which will be more fully explained by reference to the accompanying drawings, in which—

Figure 1:
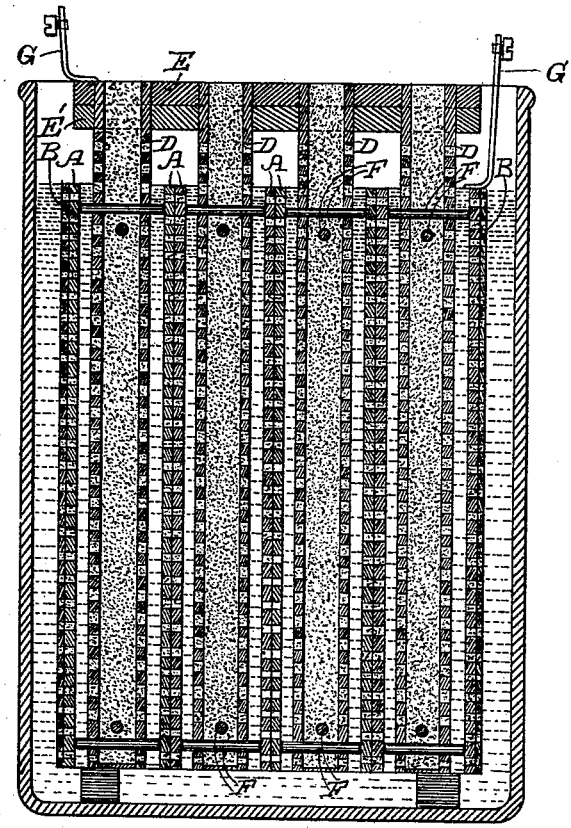
Figure 2:
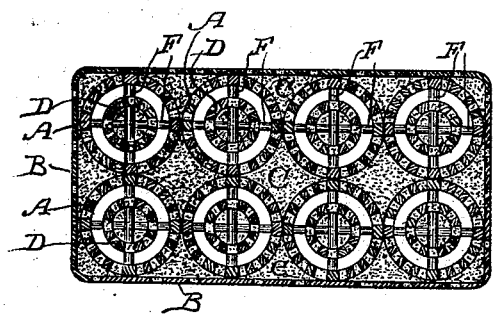

Figure 1 is a vertical section of my battery. Fig. 2 is a horizontal section.

The object of my invention is to provide certain improvements in what are known as storage batteries which are designed for the storing of electrical energy, and from which it may be drawn for use as desired.

In the ordinary construction of storage batteries, the substance which serves for the storage of electrical energy is contained in open spaces made in flat leaden plates, which are afterward secured together in series. It is difficult to retain the filling in the spaces in these flat plates, and if the battery be overcharged, the plates will be buckled and twisted out of shape. My improved battery comprises tubular or cylindrical elements, capable of retaining the filling material in place, and of resisting any tendency to buckle or warp out of shape.

In the construction of my battery I employ one or more tubes A of any suitable diameter. As shown these tubes are joined together in series, standing side by side to as great a number as may be desired for any size of battery. Around these tubes is fitted an inclosing leaden case B which incloses them so as to form a casing, and between the tubes themselves, and between the outer sides of the tubes and the inner sides of this casing B are spaces which are closed at the bottom, and then filled with the compound C which serves for the storage of the electrical energy. The tubes and the inclosing case are perforated with small holes to allow free access of the exciting liquid to the interior.

D D are leaden tubes of smaller diameter, the upper ends of which are fixed in plates E at the top, so that these smaller tubes coincide with the tubes A, and may be let down into them so as to form annular spaces within the outer and around each of the inner tubes. The plate E is strengthened by a hard rubber plate E' as shown.

In order to keep the inner tubes from contact with the outer ones, I employ short transverse pins of hard rubber, as shown at F, or rings or other suitable contrivance of a similar nature, may be employed, if preferred, but I have found that the pins are very satisfactory in practice and allow a free flow of the exciting liquid around the inner tubes. These inner tubes are perforated with holes and are filled with the material which serves to store the electricity in the same manner as the intercellular spaces of the exterior chamber. When the battery is in condition for operation, these inner tubes are let down into the exterior ones, and the chamber or vessel within which the section is contained is charged with an exciting liquid, such as dilute sulphuric acid.

Connections are made between the two poles of the battery by means of strips G, or suitable binding posts.

The filling material which I employ is known as litharge, which I mix with a certain proportion of metallic lead to increase the conductivity. This is effected in any suitable mixing apparatus. I have found a very suitable apparatus for this purpose to consist of a hollow cylinder having journal shafts at each end, and a means for rotating it. Through an opening in the side, the litharge is introduced, and also a number of leaden balls, and the cylinder being then set in motion the rubbing and contact of the balls will disengage and triturate small particles of metallic lead and will mix and thoroughly incorporate them with the litharge. When a sufficient amount of metallic lead has thus been incorporated with the litharge, the mass is removed, and is ready for use. In preparing it for the battery I make a paste of it by mixing it with glycerine and water, this mixture being very efficacious and causing the mass to set and form a hard cement within the tubes and spaces into which it is packed.

Having thus described my invention, what I claim as new, and desire to secure by Letters Patent, is—

1. In a storage battery, a series of cylindrical perforated tubes placed one within the other, an external perforated casing surrounding them, an active material or filling placed within the inner cylinders and between the outer cylinders and exterior perforated casing, and a vessel containing an exciting liquid in which the cylinders and casing are immersed.

2. In a storage battery, a series of cylindrical perforated tubes placed one within the other, a perforated casing surrounding said series of tubes, an active material placed within the inner cylinders and between the outer cylinders and surrounding casing, means for holding the cylinders out of contact with each other, and a vessel containing an exciting fluid in which the series of tubes and casing are immersed.

3. In a storage battery, a series of perforated cylinders placed one within the other, pins passing transversely through the cylinders and holding them out of contact with each other, a perforated casing surrounding the series of cylinders, an active material placed within the inner cylinders and between the outer cylinders and surrounding casing, means for connecting the opposite poles, and an outer vessel containing an exciting liquid in which the cylinders and casing are immersed.

4. In a storage battery, a series of perforated cylinders placed one within the other, a perforated casing surrounding said series of cylinders, an active material composed of litharge and finely divided metallic lead intimately mixed and packed within the inner cylinders and between the outer cylinders and surrounding casing, means for connecting the opposite poles and holding the cylinders out of contact with each other, and an outer vessel containing an exciting fluid in which the cylinders and casing are immersed.

5. In a storage battery, a series of perforated cylinders placed one within the other, a surrounding perforated casing, means for holding the cylinders out of contact with each other, plates in which the upper ends of the inner cylinders are secured, means for connecting opposite poles, an active material placed within the inner cylinders and between the outer cylinders and surrounding casing, and an outer vessel to contain an exciting fluid in which the cylinders and casing are immersed.

In witness whereof I have hereunto set my hand.

GEORGE B. FRALEY.

Witnesses:
  GEO. H. STRONG,
  J. A. BAYLESS.